United States Patent
Caracciolo, Jr.

[11] Patent Number: 5,855,794
[45] Date of Patent: *Jan. 5, 1999

[54] HIGH VOLUME SELF-CLEANING FILTER AND METHOD OF CLEANING SAME

[75] Inventor: Louis D. Caracciolo, Jr., Atco, N.J.

[73] Assignee: The BOC Group, Inc., Murray Hill, N.J.

[*] Notice: The term of this patent shall not extend beyond the expiration date of Pat. No. 5,632,903.

[21] Appl. No.: 863,040

[22] Filed: May 23, 1997

Related U.S. Application Data

[63] Continuation of Ser. No. 475,645, Jun. 7, 1995, Pat. No. 5,632,903.

[51] Int. Cl.⁶ .......................... B01D 29/66; B01D 17/12
[52] U.S. Cl. .......................... 210/739; 55/302; 210/107; 210/108; 210/333.01; 210/408; 210/411; 210/414; 210/791
[58] Field of Search .................. 210/85, 87, 90, 210/107, 108, 323.2, 329, 333.01, 333.1, 335, 340, 341, 397, 411, 414, 415, 739, 741, 780, 791, 798, 433.1, 497.01, 413, 96.1, 408; 55/96.1, 294, 302

[56] References Cited

U.S. PATENT DOCUMENTS

| | | | |
|---|---|---|---|
| 2,275,958 | 3/1942 | Hagel . | |
| 2,772,786 | 12/1956 | Gardes . | |
| 3,064,815 | 11/1962 | Baxter | 210/108 |
| 3,129,171 | 4/1964 | Rosaen | 210/415 |
| 3,574,509 | 4/1971 | Zentis | 210/107 |
| 3,831,755 | 8/1974 | Goodman et al. | 210/108 |
| 3,853,756 | 12/1974 | Stana . | |
| 3,862,035 | 1/1975 | Goodman . | |
| 4,024,504 | 5/1977 | Drori | 210/107 |
| 4,271,018 | 6/1981 | Drori | 210/107 |
| 4,273,192 | 6/1981 | Saadeh et al. | 210/108 |
| 4,282,105 | 8/1981 | Crowe | 210/798 |
| 4,292,177 | 9/1981 | Stahl et al. | 210/325 |
| 4,443,346 | 4/1984 | Muller | 210/791 |
| 4,592,847 | 6/1986 | Schumacher | 210/108 |
| 4,636,306 | 1/1987 | Radmall | 210/108 |
| 4,639,315 | 1/1987 | Fuchs et al. | 210/333.1 |
| 4,643,828 | 2/1987 | Barzuza | 210/415 |
| 4,830,642 | 5/1989 | Tatge et al. | 210/333.1 |
| 4,867,879 | 9/1989 | Muller | 210/415 |
| 4,923,068 | 5/1990 | Crowson | 210/108 |
| 4,966,701 | 10/1990 | Goodman et al. . | |
| 5,030,347 | 7/1991 | Drori | 210/414 |
| 5,228,943 | 7/1993 | Drori | 210/107 |
| 5,254,246 | 10/1993 | Rivelli et al. | 210/333.1 |
| 5,268,095 | 12/1993 | Barzuza | 210/411 |
| 5,296,134 | 3/1994 | Zaiter . | |
| 5,514,270 | 5/1996 | Barzuza | 210/411 |

*Primary Examiner*—Joseph Drodge
*Attorney, Agent, or Firm*—Finnegan, Henderson, Farabow, Garrett, & Dunner L.L.P.

[57] ABSTRACT

The present invention relates to a filter unit, and a filtering system using the filter unit. The filter unit includes a housing having a longitudinal axis and an inlet and outlet for fluid containing solid contaminants and a back-flush inlet and back-flush outlet for cleansing fluid. This housing contains a substantially cylindrical filter element which has a longitudinal axis coincident with the longitudinal axis of the housing. The filter element has disposed within it a conduit, adapted to be opened to atmospheric discharge, having a longitudinal axis coincident with the longitudinal axis of the filter element. The conduit also has disposed along its surface cleansing members, which extend from the conduit to the filter element and have apertures to allow the cleansing fluid to flow through the members and into the conduit. The filter unit rotates the conduit and/or the filter element about its longitudinal axis and detects when the degree of contamination of the filter unit in service reaches a level at which the flow of fluid containing solid contaminants through the filter unit drops below an effective level. The filter unit also closes the inlet and outlet for fluid containing solid contaminants and opens the inlet and outlet for cleansing fluid to atmospheric discharge when the degree of contamination reaches that level.

30 Claims, 2 Drawing Sheets

HIGH VOLUME SELF-CLEANING FILTER AND METHOD OF CLEANING SAME

This is a continuation of application Ser. No. 08/475,645, Jun. 7, 1995, now U.S. Pat. No. 5,632,903.

BACKGROUND OF THE INVENTION

The present invention relates to a high volume self-cleaning filter which may be preferably used to filter fluids containing solid contaminants.

Fluid filtering systems are known in which two filter units are arranged in parallel such that when one unit is in service the other unit is out of service. This arrangement allows the latter unit to be cleaned or maintained while the system remains in service.

Cleaning of the out-of-service unit may be affected by back-flushing of the filter element, i.e., causing a flow of fluid through the filter in the direction opposite the normal filtering flow, by means of a rotary member having nozzles through which high pressure fluid is discharged. In this way foreign matter adhering to the surface of the filter element is washed off and out of the filter unit.

On completion of the back-flushing, the unit is then ready to be brought back into service. Thus, when the other unit becomes sufficiently contaminated, the newly cleaned unit may be brought back on line and the contaminated filter taken out of service for cleaning. Continuous filtration by the system can therefore proceed unhindered.

A problem in many such filtering systems, however, is with materials which tend to plasticize and blind the filter element. This problem is particularly evident in filtering operations involving fluids containing biological contaminants, such as fats and proteins. For example, in processing apparatus for carcasses, such as poultry carcasses, fluids such as coolant liquids (for storage and transportation) or heating liquids such as scalding water (to facilitate removal of feathers) are contaminated by fats from the carcass. Fats and similar biological contaminants have a tendency to agglomerate and form sheets which can quickly foul most filter systems. Accordingly, there is a particular need in the art for a filtering system which can provide continuous filtering of fluids containing solid contaminants.

SUMMARY OF THE INVENTION

Accordingly, the present invention is directed to a high volume self-cleaning filter unit which may be used to filter fluids containing solid contaminants. Additional features and advantages of the invention will be set forth in the description which follows, and in part will be apparent from the description or may be learned from practice of the invention. The advantages of the invention will be realized and attained by the apparatus particularly pointed out in the written description and claims.

To achieve these and other advantages and in accordance with the purpose of the invention, as embodied and broadly described, the invention provides a filter unit comprising a housing having a longitudinal axis, an inlet and outlet for fluid containing solid contaminants and a back-flush inlet and back-flush outlet for cleansing fluid. This housing contains a substantially cylindrical filter element which has a longitudinal axis coincident with the longitudinal axis of the housing. The filter element has disposed within it a conduit, adapted to be opened to atmospheric discharge, having a longitudinal axis coincident with the longitudinal axis of the filter element. The conduit also has disposed along its surface cleansing members, which extend from the conduit to the filter element and which have apertures to allow the flow of cleansing fluid through the member and into the conduit. The filter unit further comprises means for rotating one or both of the filter element and the conduit about their respective longitudinal axes and means for detecting when the degree of contamination of the filter unit reaches a level at which the flow of fluid containing solid contaminants through the filter unit drops below an effective level. The filter unit also comprises means for closing the inlet and outlet for fluid containing solid contaminants and opening the back-flush inlet and back-flush outlet for cleansing fluid to atmospheric discharge when the degree of contamination reaches that level.

There is also provided a filtering system comprising a plurality of the filter units described above arranged in parallel such that the flow of fluid occurs through only one of the filter units at a time, each other being out of service, and means for causing the bypassing of the in-service filter unit and the bringing of another filter unit into service such that the fluid then flows through this other filter unit. Two or more pairs of filter units may be arranged in series.

It is to be understood that both the foregoing general description and the following detailed description are exemplary and explanatory and are intended to provide further explanation of the invention as claimed.

DETAILED DESCRIPTION OF THE INVENTION

Preferred embodiments of the present invention will now be described with reference to FIGS. 1 and 2, which depict a filter unit and filter system for filtering fluid containing solid contaminants.

Figure 1:
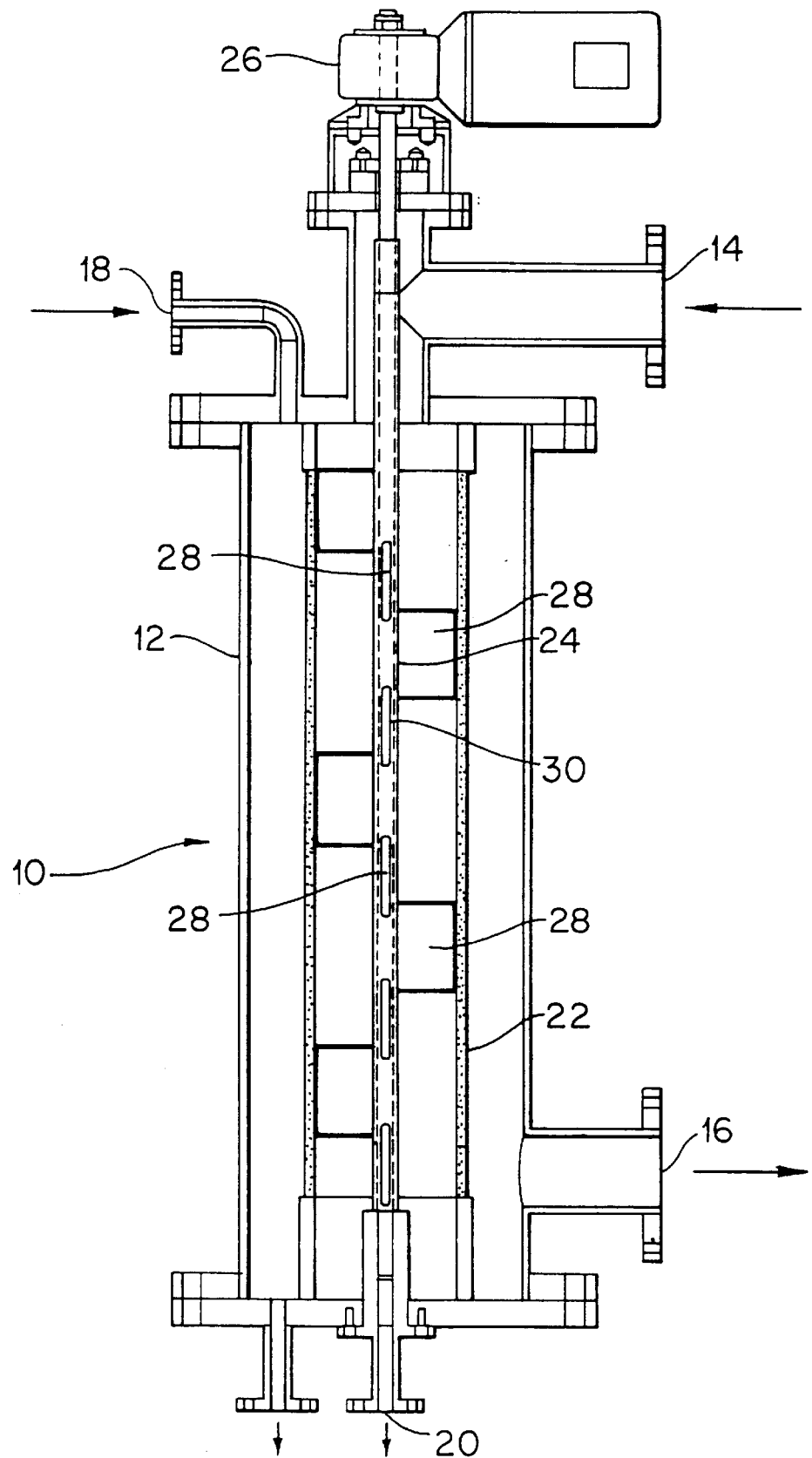
FIG. 1 is a cross section of a filter unit in accordance with a first embodiment of the invention.

FIG. 1 depicts a first preferred embodiment of the present invention, which is directed to a filter unit, generally 10, comprising a housing 12 having a longitudinal axis, an inlet 14 and outlet 16 for fluid containing solid contaminants and a back-flush inlet 18 and back-flush outlet 20 for cleansing fluid. Preferably, both the fluid containing solid contaminants and the cleansing fluid are aqueous fluids, i.e., water-based fluids, which may contain one or more additives depending upon the particular application, such as disinfectants, surfactants, detergents, preservatives, microbicides and the like. In an alternative embodiment (not shown), cleansing fluid may be introduced into housing 12 through a plurality of inlets provided along the interior surface of housing 12.

Housing 12 is preferably cylindrical and contains a cylindrical filter element 22 which has its longitudinal axis coincident with the longitudinal axis of the housing. Cylindrical filter element 22 is preferably a porous filter element, such as a metal screen having pores of a given diameter. The selection of a particular diameter pore is dependent upon the intended use of the filter, particularly the specific contaminant(s) to be filtered. Preferably, the cylindrical filter element is a metal screen having pores of a diameter of from about 400 microns down to 1 micron or less.

Inlet 14 for fluid containing solid contaminants is disposed such that, during the filtering phase of operation of the filter unit, fluid containing solid contaminants flows into cylindrical filter element 22 disposed within cylindrical filter housing 12. Fluid then passes through filter element 22, from interior to exterior, and solid contaminants, e.g., biological contaminants such as fats and proteins, are retained on filter element 22 and removed from the fluid. Outlet 16 for fluid is disposed such that fluid that is outside filter element 22, but within filter housing 12, i.e., fluid having passed through filter element 22, flows out of filter housing 12.

Filter element 22 has disposed within it a conduit 24, which has terminal ends and is adapted to rotate about its longitudinal axis and to be opened to atmospheric discharge. Conduit 24 has its longitudinal axis coincident with the longitudinal axis of the filter element 22. Conduit 24 has at one terminal end the outlet 20 for cleansing fluid. At the other terminal end of conduit 24 is rotating means 26, such as a gearmotor, for rotating the conduit about its longitudinal axis during the cleansing phase of operation.

In an alternative embodiment (not shown), filter element 22 is adapted to rotate about its longitudinal axis. In such an embodiment, rotating means such as a gearmotor is provided to rotate filter element 22 about its longitudinal axis during cleansing. In another alternative embodiment (not shown), both filter element 22 and conduit 24 are adapted to rotate about their respective longitudinal axes. In such an embodiment, rotating means, such as one or more gearmotors, are provided to rotate one or both of filter element 22 and conduit 24.

Conduit 24 has externally disposed cleansing members 28, such as scanners, which extend from conduit 24 to filter element 22. Cleansing scanners 28 have apertures 30 to allow the flow of cleansing fluid through the cleansing members and into conduit 24. Preferably, cleansing scanners 28 are in the form of apertured blades or plates.

Filter unit 10 also includes means (not shown) for detecting when the degree of contamination reaches a level at which the flow of fluid through filter unit 10 drops below an effective level. A pressure differential switch may preferably be used as the detecting means.

Filter unit 10 further includes means (not shown) for closing inlet 14 and outlet 16 for fluid containing solid contaminants and opening back-flush inlet 18 and back-flush outlet 20 for cleansing fluid when the flow of fluid drops below an effective level. Solenoid valves may be used as the means for opening and closing inlets 14,18 and outlets 16,20.

In operation, fluid containing solid contaminants is caused to flow into filter element 22 through inlet 14. The fluid passes through the pores of filter element 22, thereby filtering solid contaminants from the fluid, and into filter housing 12. The fluid then passes out of filter housing 12 through outlet 16.

When flow of fluid through the filter unit becomes sufficiently restricted by the buildup of contaminants on filter element 22, the filter unit is then cleansed by back-flushing. During cleansing, inlet 14 and outlet 16 for fluid containing solid contaminants are sealed. Conduit 24 is then opened to atmospheric discharge. In the embodiment shown in FIG. 1, rotating means 26 for rotating the conduit, such as a gearmotor, is activated, causing conduit 24 to rotate about its longitudinal axis.

Conduit 24 and/or filter element 22 may rotate at any speed suitable for the cleansing operation. Preferably, rotation is at a variable speed which is dependent upon the degree of contamination of filter element 22. In such a preferred embodiment of the present invention, the means for detecting the degree of contamination of the filter element includes means, such as an auto sensing system, which may also vary the speed at which conduit 24 and/or filter element 22 rotates based upon the degree of contamination. Generally the speed of rotation will increase relative to an increase in the degree of contamination.

In the embodiment shown in FIG. 1, once conduit 24 is opened to atmospheric discharge and begins to rotate, cleansing fluid enters filter housing 12 through back-flush inlet 18. Cleansing fluid back-flushes filter element 22, i.e., passes through pores of filter element 22 in a direction opposite the normal filtering flow, to remove contaminants from the pores of filter element 22.

The back-flushed cleansing fluid containing the removed contaminants, now within filter element 22, passes through apertures 30 on cleansing members 28 and into conduit 24. The cleansing fluid containing the contaminants then passes out of conduit 24 through back-flush outlet 20.

In a preferred embodiment, the cleansing fluid is pressurized. Preferably, the cleansing fluid is pressurized either within housing 12, e.g., by the restricted flow of cleansing fluid through filter element 22 due to the degree of contamination, or before entering housing 12, e.g., by increasing the flow rate of the cleansing fluid. When the cleansing fluid is pressurized, the cleansing process is facilitated by the differential between the pressure in conduit 24 (atmospheric pressure) and the pressure in filter element 22 (the pressure of the cleansing fluid). Preferably, the pressure of the cleansing fluid is between 37 and 250 pounds per square inch. The particular pressure employed depends, inter alia, upon the degree of contamination of filter element 22. In a particularly preferred embodiment of the present invention, the means for detecting the degree of contamination includes means, such as an auto sensing system, which may be adapted to vary the pressure of the cleansing fluid based upon the degree of contamination.

Figure 2:
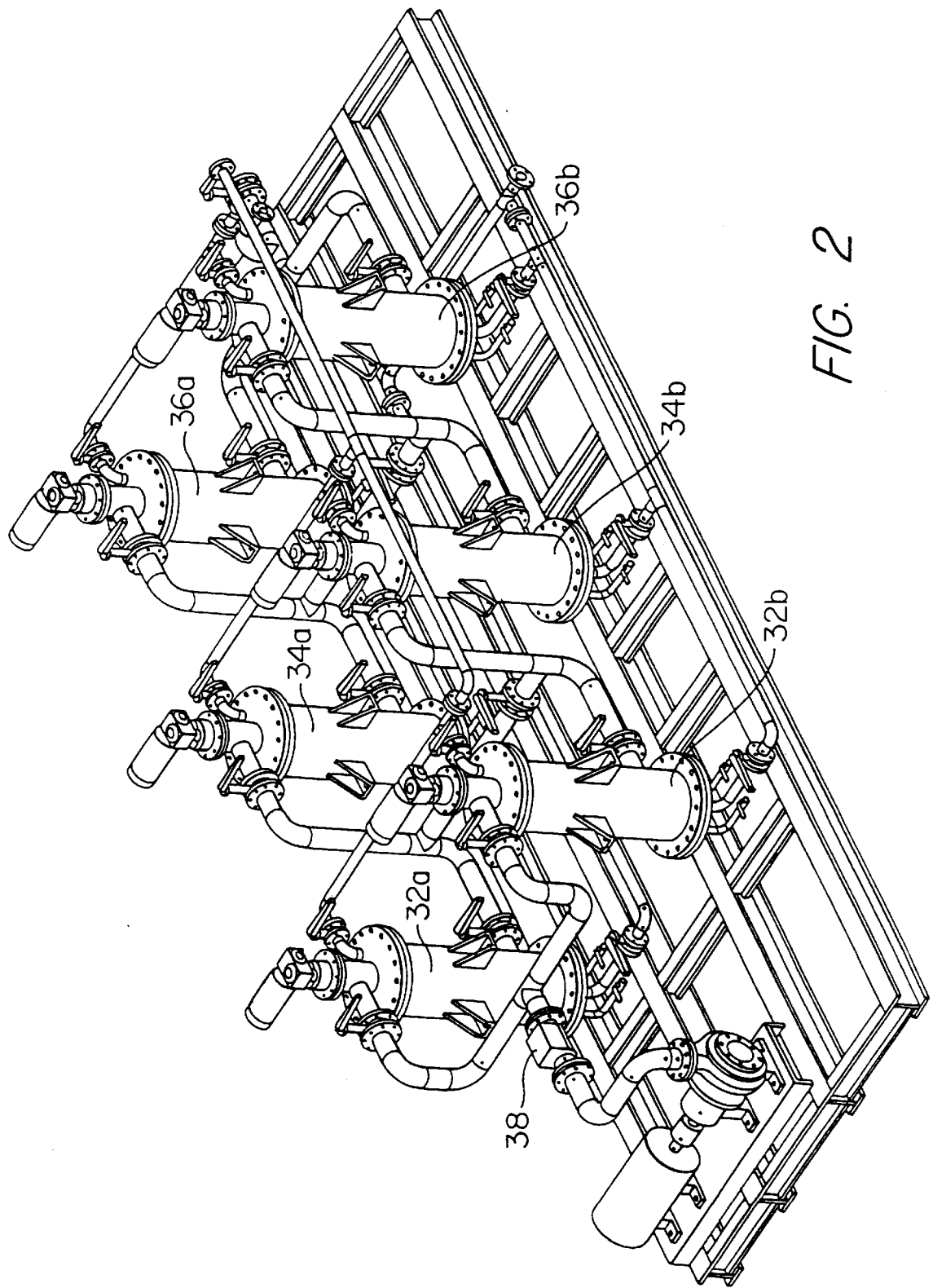
FIG. 2 is a diagrammatic representation of a fluid filtering system which includes at least two parallel filter units of the type shown in FIG. 1.

FIG. 2 depicts a second preferred embodiment of the present invention, which is directed to a fluid containing solid contaminants filtering system having three pairs of the above-described filter units 32a and 32b, 34a and 34b, and 36a and 36b, each pair of filter units arranged in parallel such that the flow of fluid occurs through only one filter unit of each pair of filter units at a time, the other filter unit of the pair being out of service.

Preferably, each downstream pair of filter units contains a filter element having progressively smaller diameter pores. For example, in a particularly preferred embodiment useful for processing apparatus for poultry carcasses, each of filter unit pair 32a and 32b contains a filter element having pores with a diameter of about 100 microns, each of filter unit pair 34a and 34b contains a filter element having pores with a diameter of about 60 microns and each of filter unit pair 36a and 36b contains a filter element having pores with a diameter of about 20 microns.

The preferred fluid filtering system also comprises means 38 for detecting when the degree of contamination of the filter element of the in-service filter unit of each pair reaches a level at which the flow of fluid drops below an effective level. Preferably, means 38 also causes the shutting down and bypassing of the contaminated filter and brings into service the other filter unit of each pair. Thus, when a filter unit in service reaches a level of contamination at which it is no longer effective for providing the requisite flow of filtered fluid, this unit is taken out of service for cleaning and the fluid then flows through the other filter unit of each pair. In a particularly preferred embodiment, means 38 is a flowmeter.

The filter unit of the present invention directly addresses and impacts the above-described plastic blinding problems while also offering high volume flow rates ranging, for example, from 400 to 2,000 gallons per minute.

The following example is merely illustrative of the invention and should not be construed as limiting. One skilled in the art can make, without undue experimentation, various substitutions and variations and by equivalent means, performing in substantially the same manner, obtain substantially the same results without departing from the teaching and spirit of the invention.

In a fluid filtering system having two of the inventive filter units arranged in parallel and operating at a flow rate of 400 gallons per minute, when the pressure differential between the pressure of the fluid through inlet 14 and the pressure of the fluid through outlet 16 in one filter unit reaches approximately seven pounds, detecting means 38 will sense that filter element 22 in that unit is sufficiently contaminated and signal the parallel filter unit to come on-line. When the detecting means brings the clean parallel filter unit on-line, it also shuts down the contaminated filter unit. At this point in time, the following simultaneously occur in the contaminated filter unit:

(a) inlet 14 and outlet 16 for fluid containing solid contaminants are tightly closed, for example by solenoid valves;

(b) conduit 24 on which cleansing members 28 are mounted is opened to atmospheric discharge;

(c) rotating means 26, such as an electric motor, is activated, causing conduit 24 to rotate about its longitudinal axis; and (d) filter housing 12 is pressurized with cleansing fluid, such as clean tap water, to approximately 100 pounds per square inch.

As the pressurized cleansing fluid back-flushes filter element 22, flushing the retained solid contaminants therefrom, the cleansing fluid and contaminants can exit only through cleansing members 28 into conduit 24 and out through back-flush outlet 20 to the atmosphere. With 100 pound pressure cleansing fluid coming through filter element 22 and cleansing members 28 offering everything inside filter element 22 zero discharge pressure, cleansing members 28 effectively vacuum filter element 22 from the inside where the contaminants were collected while the 100 pound pressure cleansing fluid forces everything off the filter element from the outside. With these parameters, cleansing of filter element 22 requires only about 35 to 60 seconds. Once detecting means 38 senses that the filter unit has been cleaned, the filter unit is shut down to await a signal to come back on-line.

Although preferred embodiments of the invention are described herein in detail, it will be understood by those skilled in the art that variations may be made thereto without departing from the spirit of the invention or the scope of the appended claims.

What is claimed is:

1. A filter unit comprising:

a housing having an inlet for liquid carrying solid contaminants, an outlet for filtered liquid, and a back-flush inlet and back-flush outlet for cleansing fluid, said housing containing a substantially cylindrical filter element having a longitudinal axis and a conduit disposed in the filter element, said conduit having a longitudinal axis and being in fluid communication with said back flush outlet for cleansing fluid;

cleansing members disposed on said conduit, said cleansing members extending from said conduit toward said filter element and having apertures to allow the flow of cleansing fluid into said conduit;

means for closing said inlet and outlet for liquid and opening said back-flush inlet and back-flush outlet for cleansing fluid when contamination of said filter element reaches a level at which flow of liquid through said filter element falls below a predetermined level; and means for rotating one or both of said conduit and said filter element about their respective longitudinal axes, wherein said inlet and outlet for liquid are disposed such that said liquid carrying solid contaminants flows into an interior of said cylindrical filter element, said filter element filters the solid contaminants from the liquid, and the filtered liquid passes through said cylindrical filter element to an exterior thereof before exiting said filter unit via said outlet for filtered liquid, wherein said back-flush inlet and back-flush outlet for cleansing fluid are disposed such that said cleansing fluid flows through said filter element from the exterior thereof in a direction opposite the flow of said filtered liquid before exiting said filter unit via said apertures, said conduit, and said back-flush outlet, and wherein said back-flush inlet for cleansing fluid is disposed so that said cleansing fluid flows into a space defined between said housing and said filter element before said cleansing fluid flows through said filter element.

2. The filter unit according to claim 1, wherein said cleansing fluid is pressurized.

3. The filter unit according to claim 2, further comprising means for detecting the degree of contamination of said filter element and means adapted to vary the pressure of said cleansing fluid.

4. The filter unit according to claim 2, wherein said cleansing fluid is pressurized to from 37 to 250 pounds per square inch.

5. The filter unit according to claim 1, wherein said cleansing fluid is an aqueous fluid.

6. The filter unit according to claim 1, wherein said liquid is an aqueous fluid liquid.

7. The filter unit according to claim 1, wherein said means for rotating one or both of said conduit and said filter element is a gearmotor.

8. The filter unit according to claim 1, further comprising means for detecting the degree of contamination of said filter element and means adapted to vary the speed at which one or both of said conduit and said filter element is rotated.

9. The filter unit according to claim 1, wherein said means for closing said inlet and outlet for liquid comprises solenoid valves.

10. The filter unit according to claim 1, wherein said means for opening said back-flush inlet and back-flush outlet for cleansing fluid comprises solenoid valves.

11. The filter unit according to claim 1, wherein said rotating means rotates said conduit about its longitudinal axis.

12. The filter unit of claim 11, wherein said conduit is coupled to the housing so that said conduit lacks translation during rotation of the conduit.

13. The filter unit according to claim 1, wherein said rotating means rotates said filter element about its longitudinal axis.

14. The filter unit according to claim 1, wherein said rotating means rotates both said conduit about its longitudinal axis and said filter element about its longitudinal axis.

15. A filtering system comprising:
a plurality of filter units as claimed in claim 1 arranged in parallel such that the flow of liquid occurs through one of said filter units while another of said filter units is out of service; and
means for causing the bypassing of said one of said filter units and for bringing of said other of said filter units into service such that the liquid then flows through said other of said filter units.

16. The filtering system according to claim 15, wherein said plurality of filter units comprises two of said filter units.

17. The filtering system according to claim 15, wherein said plurality of filter units comprises six of said filter units arranged in three parallel pairs of said filter units.

18. The filtering system according to claim 17, wherein each pair of said three parallel pairs of said filter units contains a filter element having pores with diameters that are different from the diameters of the pores of the filter elements of the other parallel pairs.

19. The filtering system according to claim 18, wherein said three parallel pairs include a first pair of said filter units, a second pair of said filter units downstream from the first pair, and a third pair of said filter units downstream from said second pair, each of said second pair of filter units containing a filter element having pores with a diameter smaller than the diameter of pores of filter elements of said first pair, and each of said third pair of filters containing a filter element having pores with a diameter smaller than the diameter of pores of filter elements of said second pair.

20. The filter unit of claim 1, further comprising means for detecting the degree of contamination of said filter element, wherein said closing and opening means closes said inlet and outlet for liquid and opens said back-flush inlet and back-flush outlet for cleansing fluid when the detected degree of contamination of said filter element reaches a level at which flow of liquid through said filter element falls below a predetermined level.

21. The filter unit of claim 1, wherein the cleansing members extend in different directions from said conduit.

22. The filter unit of claim 1, wherein the cleansing members extend from said conduit to said filter element.

23. A filter unit comprising:
a housing having an inlet for liquid carrying solid contaminants, an outlet for filtered liquid, and a back-flush inlet and back-flush outlet for cleansing fluid, said housing containing
a substantially cylindrical filter element having a longitudinal axis and
a conduit disposed in the filter element, said conduit having a longitudinal axis and being in fluid communication with said back flush outlet for cleansing fluid;
cleansing members disposed on said conduit, said cleansing members extending from said conduit toward said filter element and having apertures to allow the flow of cleansing fluid into said conduit;
means for closing said inlet and outlet for liquid and opening said back-flush inlet and back-flush outlet for cleansing fluid when contamination of said filter element reaches a level at which flow of liquid through said filter element falls below a predetermined level; and
means for rotating said conduit about its longitudinal axes,
wherein said inlet and outlet for liquid are disposed such that said liquid carrying solid contaminants flows into an interior of said cylindrical filter element, said filter element filters the solid contaminants from the liquid, and the filtered liquid passes through said cylindrical filter element to an exterior thereof before exiting said filter unit via said outlet for filtered liquid,
wherein said back-flush inlet and back-flush outlet for cleansing fluid are disposed such that said cleansing fluid flows through said filter element from the exterior thereof in a direction opposite the flow of said filtered liquid before exiting said filter unit via said apertures, said conduit, and said back-flush outlet, and
wherein said conduit is coupled to the housing so that said conduit lacks translation during rotation of the conduit.

24. A filter unit comprising:
a housing having an inlet for liquid carrying solid contaminants, an outlet for filtered liquid, and a back-flush inlet and back-flush outlet for cleansing fluid, said housing containing
a substantially cylindrical filter element having a longitudinal axis and
a conduit disposed in the filter element, said conduit having a longitudinal axis and being in fluid communication with said back flush outlet for cleansing fluid;
cleansing members disposed on said conduit, said cleansing members extending from said conduit to said filter element and having apertures to allow the flow of cleansing fluid into said conduit;
means for closing said inlet and outlet for liquid and opening said back-flush inlet and back-flush outlet for cleansing fluid when contamination of said filter element reaches a level at which flow of liquid through said filter element falls below a predetermined level; and
means for rotating said conduit about its longitudinal axes,
wherein said inlet and outlet for liquid are disposed such that said liquid carrying solid contaminants flows into an interior of said cylindrical filter element, said filter element filters the solid contaminants from the liquid, and the filtered liquid passes through said cylindrical filter element to an exterior thereof before exiting said filter unit via said outlet for filtered liquid, and
wherein said back-flush inlet and back-flush outlet for cleansing fluid are disposed such that said cleansing fluid flows through said filter element from the exterior thereof in a direction opposite the flow of said filtered liquid before exiting said filter unit via said apertures, said conduit, and said back-flush outlet.

25. A method of filtering solid particles from liquid using a cylindrical filter element having an interior and an exterior, the method comprising the steps of:
passing liquid carrying solid particles into the interior of the cylindrical filter element disposed in a housing;
filtering the solid particles from the liquid while allowing the liquid to pass through the filter element to the exterior of the filter element;
removing the filtered liquid from the housing;
flowing cleansing fluid into a space defined between the housing and the filter element before passing the cleansing fluid through said filter element from the exterior of the filter element to the interior of the filter element so that the cleansing fluid flushes particles from the filter element;
rotating at least one of the filter element and a conduit disposed in the cylindrical filter element, the conduit having a plurality of cleansing members extending therefrom, the cleansing members having apertures; and draining the cleansing fluid and flushed particles through the plurality of cleansing members and the conduit.

26. The method of claim 25, wherein the step of flowing includes the substep of pressurizing the defined space with the cleansing fluid.

27. The method of claim 26, wherein during the substep of pressurizing, a pressure of cleansing fluid in the conduit is less than a pressure of cleansing fluid in the defined space.

28. The method of claim 25, further comprising the steps of sensing the amount of solid particles filtered by the filter element, and controlling flow of cleansing fluid according to the sensed amount of filtered solid particles.

29. The method of claim 25, wherein the step of rotating includes rotating the conduit so that the conduit lacks translation.

30. The method of claim 25, further comprising the step of contacting the interior of the filter element with the cleansing members.

* * * * *

UNITED STATES PATENT AND TRADEMARK OFFICE
CERTIFICATE OF CORRECTION

PATENT NO.: 5,855,794

DATED: January 5, 1999

INVENTOR(S): Louis D. Caracciolo, Jr.

It is certified that an error appears in the above-identified patent and that said Letters Patent is hereby corrected as shown below:

Claim 6, col. 6, line 42, delete "fluid".

Signed and Sealed this

Sixth Day of April, 1999

*Attest:*

Q. TODD DICKINSON

*Attesting Officer*    *Acting Commissioner of Patents and Trademarks*